MOORE & REID.
Plow Fender.

No. 98,989.  Patented Jan. 18, 1870.

Witnesses:

Inventors:
Daniel Q. Moore
Frank Reid
per Alexander H. Mason
attys.

UNITED STATES PATENT OFFICE.

DANIEL O. MOORE AND FRANK REID, OF EVERTON, INDIANA.

IMPROVEMENT IN CLOD-FENDERS.

Specification forming part of Letters Patent No. 98,989, dated January 18, 1870.

*To all whom it may concern:*

Be it known that we, DANL. O. MOORE and FRANK REID, of Everton, in the county of Fayette, and in the State of Indiana, have invented certain new and useful Improvements in Corn-Shields; and we do hereby declare that the following is a full, clear, and exact description thereof, reference being had to the accompanying drawings, and to the letters of reference marked thereon, making a part of this specification.

The nature of our invention consists in the construction and arrangement of a "shield for corn-plows," as will be hereinafter fully set forth.

In order to enable others skilled in the art to which our invention appertains to make and use the same, we will now proceed to describe its construction and operation, referring to the annexed drawings, in which—

Figure 1:
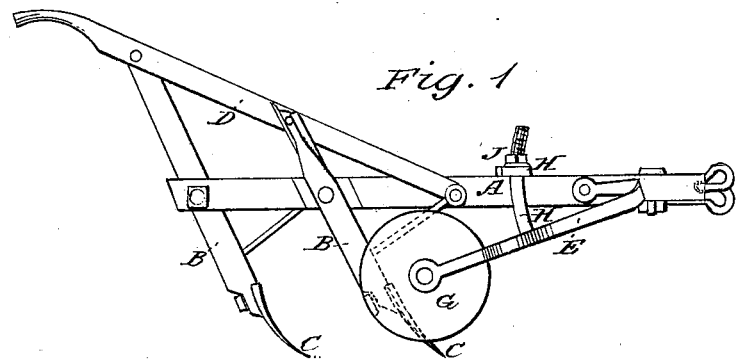
Figure 2:
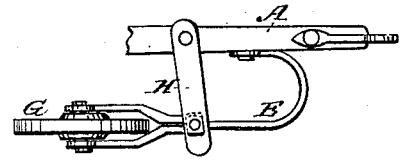

Figure 1 is a side elevation of a plow with our improvement attached; and Fig. 2 is a plan view of the shield, showing its attachment to the plow-beam.

A represents the plow-beam, B B the shanks, C C the plow-blades, and D D the handles, of a corn-plow made in any of the known and usual ways.

To the side of the beam A is secured a spring, E, which is bent or curved so as to extend forward for a short distance, then bent outward and toward the rear, running parallel, or almost parallel, with the plow-beam. The rear end of this spring is split or forked, as seen in Fig. 2, and between the two prongs is pivoted a wheel, G, of wood or other suitable material, of any diameter desired, which wheel forms the shield for the corn-plow. It will be seen that any dirt that may adhere to the wheel G is scraped off at the front edge by the spring E.

On top of the plow-beam A is secured a supporting-bar, H, the outer end of which extends over the spring E, and a screw-rod, I, secured to the spring, extends upward and passes through the outer end of the bar H, being held there at any height desired by means of the nut J. By this means the wheel G may be raised or lowered at pleasure, the spring E, not being firmly secured to the plow-beam, but rather pivoted to the same, admitting of such movement.

Having thus fully described our invention, what we claim as new, and desire to secure by Letters Patent, is—

1. The curved spring E, constructed as described, its rear end being split or forked, substantially as and for the purposes herein set forth.

2. The combination of the spring E, wheel G, supporting-bar H, rod I, and nut J, all constructed as described, and arranged to operate substantially in the manner and for the purposes herein set forth.

In testimony that we claim the foregoing we have hereunto set our hands this 7th day of August, 1869.

DAN. O. MOORE.
FRANK REID.

Witnesses:
J. P. KERR,
MORRIS SWANN.